(12) United States Patent
Miyazaki et al.

(10) Patent No.: US 7,960,052 B2
(45) Date of Patent: Jun. 14, 2011

(54) BATTERY MODULE

(75) Inventors: Yutaka Miyazaki, Hyogo (JP); Taketoshi Yoshikane, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 408 days.

(21) Appl. No.: 12/213,875

(22) Filed: Jun. 25, 2008

(65) Prior Publication Data

US 2009/0004558 A1    Jan. 1, 2009

(30) Foreign Application Priority Data

Jun. 28, 2007    (JP) ................... 2007-171065

(51) Int. Cl.
*H01M 2/24* (2006.01)
*H01M 6/42* (2006.01)

(52) U.S. Cl. .................... 429/158; 429/157; 429/99

(58) Field of Classification Search ........... 429/96–100, 429/149–160
See application file for complete search history.

(56) References Cited

U.S. PATENT DOCUMENTS

| | | | | |
|---|---|---|---|---|
| 6,340,877 B1 * | 1/2002 | Mita et al. | ...................... | 320/112 |
| 2003/0143459 A1 * | 7/2003 | Kunimoto et al. | ............ | 429/158 |
| 2004/0043287 A1 * | 3/2004 | Bando et al. | .................. | 429/156 |
| 2006/0028170 A1 * | 2/2006 | Izawa | ............................ | 320/107 |
| 2008/0090136 A1 * | 4/2008 | Kim et al. | ....................... | 429/82 |

FOREIGN PATENT DOCUMENTS

| | | |
|---|---|---|
| JP | 10-106533 | 4/1998 |
| JP | 2001-185103 | 7/2001 |

* cited by examiner

*Primary Examiner* — Basia Ridley
*Assistant Examiner* — Jacob Buchanan
(74) *Attorney, Agent, or Firm* — Wenderoth, Lind & Ponack, L.L.P.

(57) ABSTRACT

A battery module is provided with a plurality of batteries (10) joined in a straight-line configuration, insulating caps (30) that insulate the series connected batteries (10), and connecting hardware (20, 40) disposed between connected batteries (10) that connect those batteries in series. The insulating cap (30) has an outer insulating region (31) that covers outer surfaces of adjacent batteries (10) connected in series. The connecting hardware (20, 40) has a first welding section (21, 41) that is welded to the end-plane electrode (19) of one battery, a second welding section (22, 42) that is disposed outside the first welding section and is welded to the end-plane electrode of another battery (10), and welding terminals (23, 43) that are disposed outside the outer insulating region (31) of the insulating cap (30) at battery outer surfaces in a manner insulated by the outer insulating region (31).

19 Claims, 10 Drawing Sheets

FIG.1

PRIOR ART

FIG.2

PRIOR ART

FIG.3

PRIOR ART

FIG.4

PRIOR ART

BATTERY MODULE

BACKGROUND OF THE INVENTION

1. Field of the Invention

The present invention relates to a battery module, which is a plurality of batteries connected in series and joined in a straight line via connecting hardware.

2. Description of the Related Art

Battery modules that join rechargeable batteries in a straight-line configuration are used primarily in electrically driven vehicles such as the hybrid car. In this type of battery module, it is important to solidly connect batteries in a manner that has low electrical resistance. This is because large connection resistance not only reduces output, but also generates heat due to Joule-heating, resulting in further resistive loss that prevents effective power utilization. A battery module that is a plurality of batteries connected in series and joined in a straight line via connecting hardware is cited in Japanese Patent Laid-Open Publications H10-106533 (1998) and 2001-185103.

Figure 1:
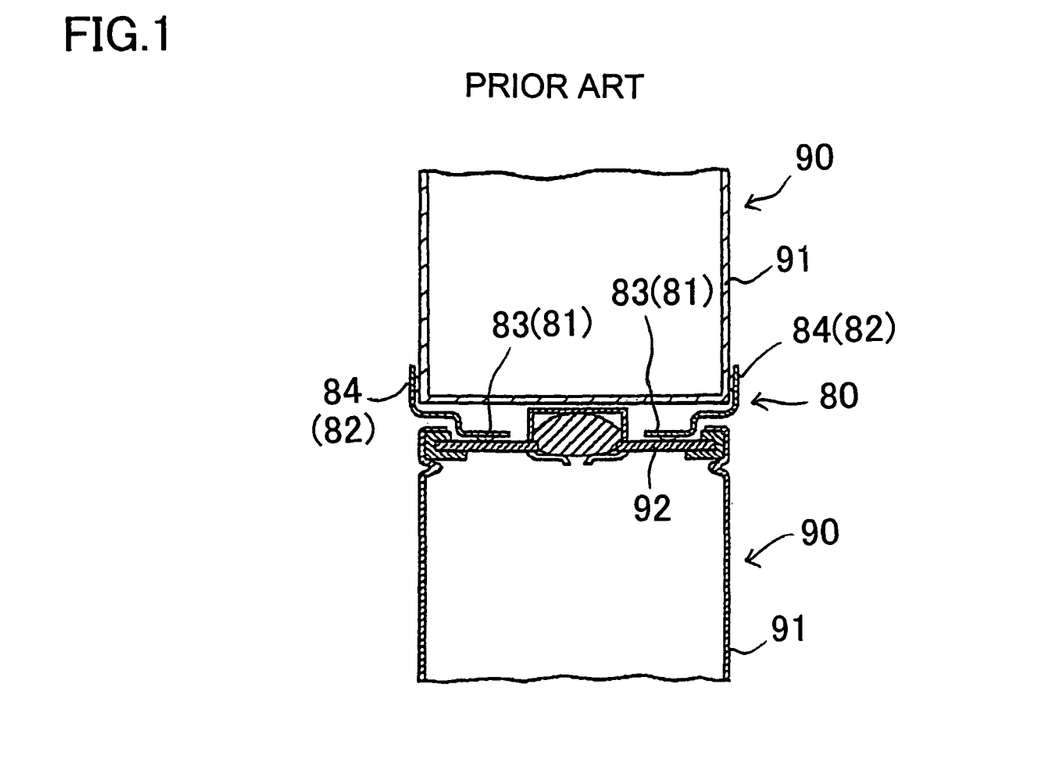
FIG. 1 is an enlarged cross-section view showing the connecting structure of a prior art battery module.
Figure 2:
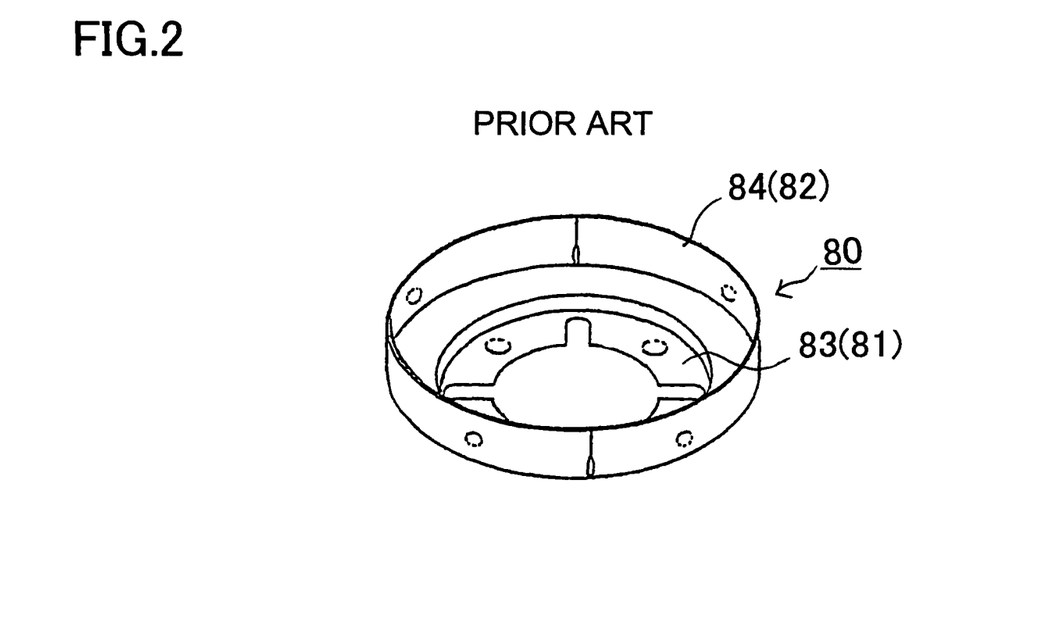
FIG. 2 is a perspective view showing the connecting hardware for the battery module of FIG. 1.

As shown in FIGS. 1 and 2, battery modules cited in these disclosures join batteries by spot welding connecting hardware 80. As shown in FIG. 2, connecting hardware 80 is made by press-forming sheet metal in the shape of a circular cylindrical section 84 around the outside of a circular disk 83. As shown in the cross-section view of FIG. 1, connecting hardware 80 has a first welding section 81, which is the circular disk 83, welded to the sealing cap 92 of a battery 90, and a second welding section 82, which is the circular cylindrical section 84, welded to the outside surface of the external case 91 of another battery 90. This connects adjacent batteries 90 in series and in a straight-line configuration.

In the battery modules described above, batteries 90 are connected in series via connecting hardware 80 according to the following steps.

(1) The first welding section 81 of the connecting hardware 80 is set on the sealing cap 92, which is an end-plane electrode of one battery 90.

(2) A pair of welding electrodes is pressed onto the first welding section 81 and welding current is passed through the welding electrodes to weld the first welding section 81 to the sealing cap 92.

(3) The bottom end of another battery 90 to be connected is inserted into the circular cylindrical section 84 of the connecting hardware 80.

(4) A pair of welding electrodes is pressed onto the second welding section 82, which is the circular cylindrical section 84, and welding current is passed through the welding electrodes to weld the second welding section 82 to the outer surface of the battery 90.

Figure 3:
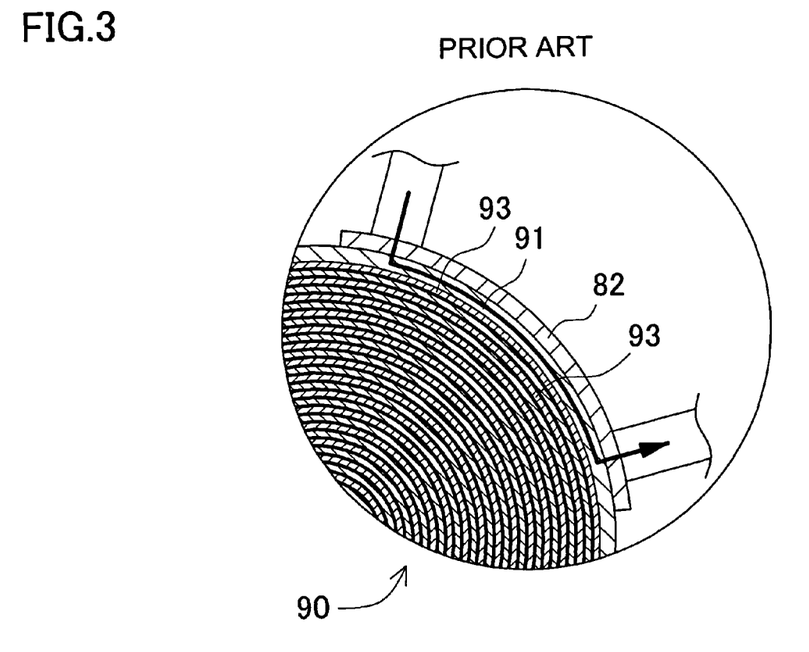
FIG. 3 is an enlarged cross-section view showing the second welding section of the connecting hardware shown in FIG. 2 being welded to the external case of a battery.

For the connecting hardware described above, there is no detrimental effect on the batteries from the step that welds the first welding section to the sealing cap of a battery. This is because no electrode comes in close connection with the inside surface of the sealing cap. However, in the step that welds the second welding section to the outer surface of a battery, damage from the flow of high welding current can detrimentally affect that battery. This is because an internal battery electrode is in close connection with the inside of the outer surface of the battery where the second welding section is welded. As shown in FIG. 3, when the second welding section 82 is welded to the outer surface of the battery 90, the outer surface of the battery 90 is heated by welding heat. Since the internal electrode 93 is in close connection with this region, the heated outer surface can apply thermal stress and damage the internal electrode 93. In an application such as a hybrid car that has many batteries connected in series, failure of one battery can render all batteries useless. Consequently, it is extremely important to minimize battery failure during use. Therefore, during battery module manufacture, it is extremely important to reduce damage due to welding current as much as possible.

Figure 4:
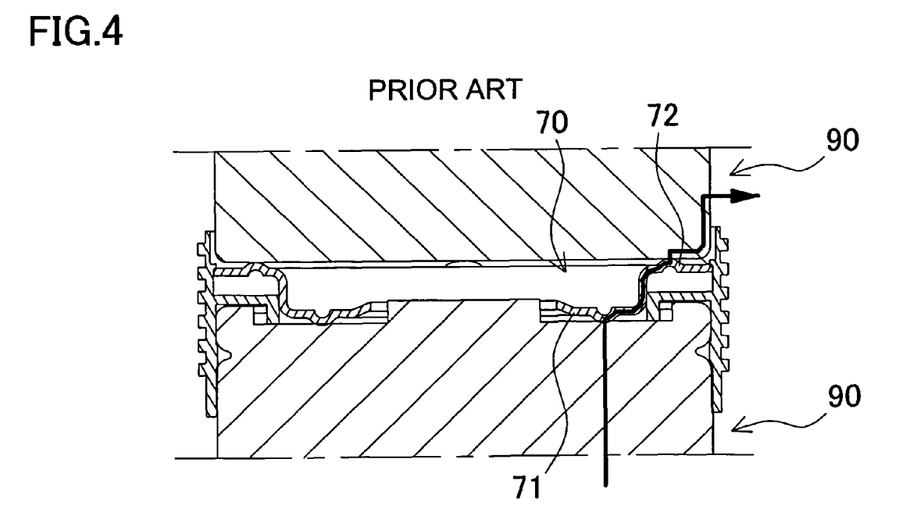
FIG. 4 is an enlarged cross-section view showing the connecting structure of another prior art battery module.

Further, as shown in the cross-section view of FIG. 4, connecting hardware 70 has been developed that welds a first welding section 71 and a second welding section 72 to opposing end-plane electrodes of the batteries 90. As shown by the arrow of FIG. 4, welding current flowing through this connecting hardware 70 simultaneously welds the first welding section 71 and the second welding section 72. To weld the first and the second welding sections to their respective end-plane electrodes in this type of battery module, it is necessary to apply a high welding current through the inside of the battery, and in particular, through battery electrodes. Consequently, high welding current can be the cause of electrode damage.

The present invention was developed to resolve the prior-art drawbacks. Thus, it is a primary object of the present invention to provide a battery module that can reliably prevent battery damage due to welding current.

SUMMARY OF THE INVENTION

The battery module of the present invention is provided with a plurality of batteries 10 joined in a straight-line configuration, insulating caps 30 that are disposed between connected batteries 10 and insulate the series connected batteries 10, and connecting hardware 20, 40 that is disposed between connected batteries 10 and connects those batteries 10 in series. An insulating cap 30 has an outer insulating region 31 that covers outer surfaces of adjacent batteries 10 connected in series. Connecting hardware 20, 40 has a first welding section 21, 41 that is welded to the end-plane electrode 19 of one battery 10, a second welding section 22, 42 that is disposed outside the first welding section 21, 41 and is welded to the end-plane electrode 19 of another battery 10, and welding terminals 23, 43 that are disposed outside the outer insulating region 31 of the insulating cap 30 at battery 10 outer surfaces in a manner insulated by the outer insulating region 31.

The battery module described above has the characteristic that battery damage due to welding current can be reliably prevented. This is because the second welding section can be welded to a battery end-plane electrode by touching welding electrodes to connecting hardware welding terminals that are insulated by the outer insulating region of the insulating cap. The second welding section is welded by welding current flowing along the path of the arrow shown in FIG. 12. Welding current following this path flows through the welding terminal 23, the second welding section 22, the end-plane electrode 19 that is the bottom surface of the external case of the battery 10, and the external case 11 to weld the second welding section to the end-plane electrode. Welding current that flows along this path does not flow inside the external case, and in particular, does not flow inside the circular cylindrical region of the external case. Therefore, no damage is incurred by the internal battery electrode in close connection with the inside of the circular cylindrical region of the external case. In the battery module of FIG. 12, the second welding section is welded to the bottom surface of the external case. The welded region, which is the bottom surface of the external case, is heated by welding heat. However, there is no internal electrode in close connection with the bottom surface of the external case, and there is no electrode damage caused by heating that region.

In the battery module of the present invention, the outer insulating region 31 of an insulating cap 30 can be cylindrical shaped for inserting the end region of a battery 10.

The battery module of the present invention can be configured with an outer insulating region 31 of an insulating cap 30 that has a first cylindrical region 31A for inserting the end region of one battery 10 and a second cylindrical region 31B for inserting the end region of another battery 10.

By inserting batteries in insulating cap cylindrical regions for the battery module described above, batteries to be joined together can be temporarily positioned with precision. Consequently, batteries can be disposed in precise positions and connecting hardware can be connected efficiently.

The battery module of the present invention can be configured with an outer insulating region 31 of an insulating cap 30 that has a first cylindrical region 31A for inserting the end region of a battery 10, and the welding terminal 23 of the connecting hardware 20 can be disposed outside that first cylindrical region 31A.

In this configuration, the second welding section can be welded to the end-plane electrode of a battery with the first cylindrical region solidly mated to the battery that is welded to the first welding section.

In the battery module of the present invention, the connecting hardware 40 can be insert molded with the insulating cap 30.

In this configuration, the connecting hardware and insulating cap have a single-piece structure allowing efficient connection and simplified manufacture due to reduction in the number of parts.

The battery module of the present invention can also be configured with the insulating cap 30 and connecting hardware 20 as separate parts. The insulating cap 30 is provided with openings 33 through which welding terminals 23 can pass, and the connecting hardware 20 welding terminals 23 are inserted through the openings 33 to join the connecting hardware 20 with the insulating cap 30.

In this battery module configuration, the connecting hardware and insulating cap can be inexpensively manufactured in quantity.

Further, the battery module of the present invention can have an insulating cap 30 that is made of rubber-like flexible material.

In the battery module described above, since the insulating cap is made of rubber-like flexible material, batteries can be joined by an insulating cap that serves as a shock absorber.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 5:
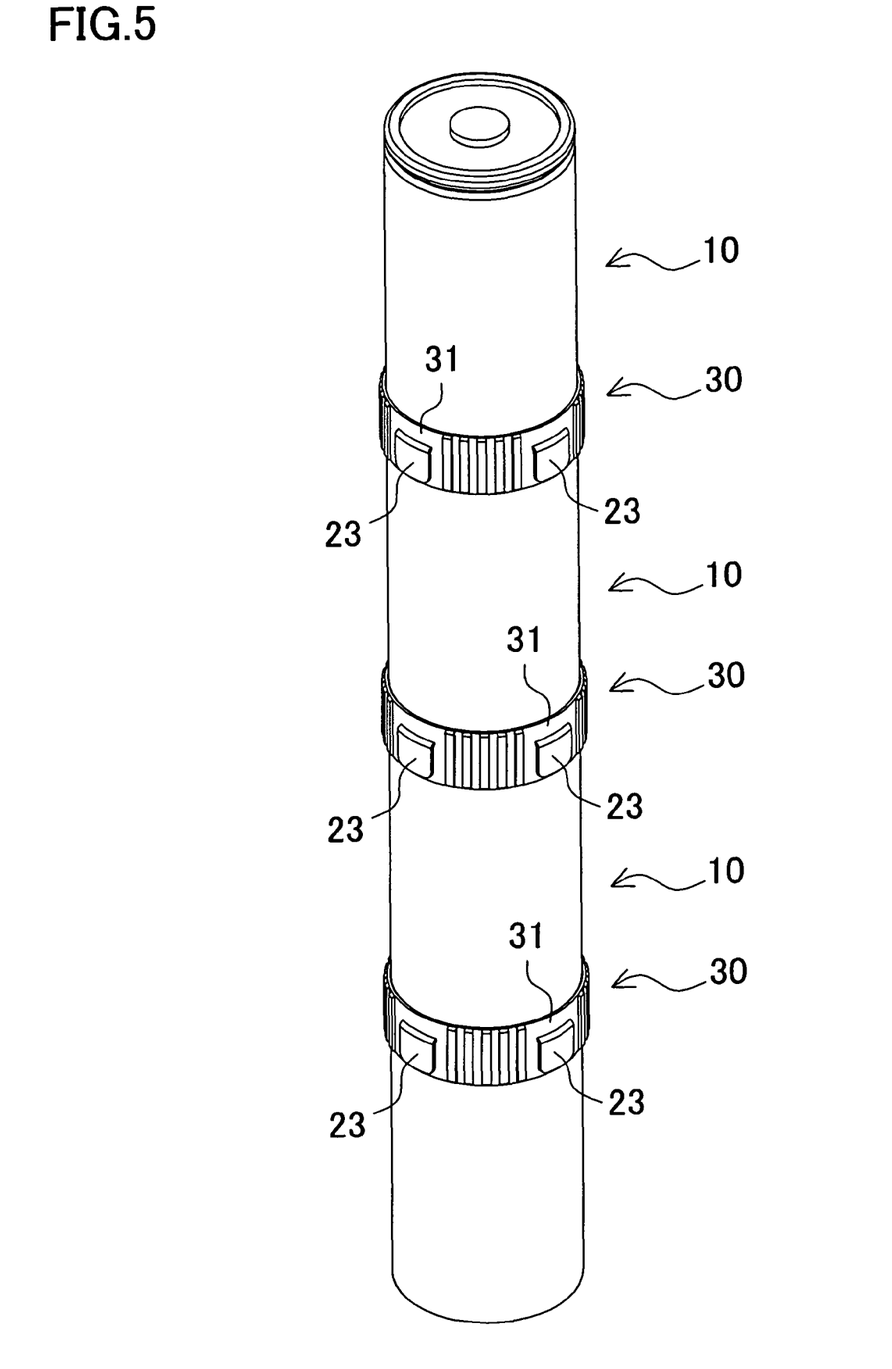
FIG. 5 is a perspective view of a battery module for one embodiment of the present invention.
Figure 6:
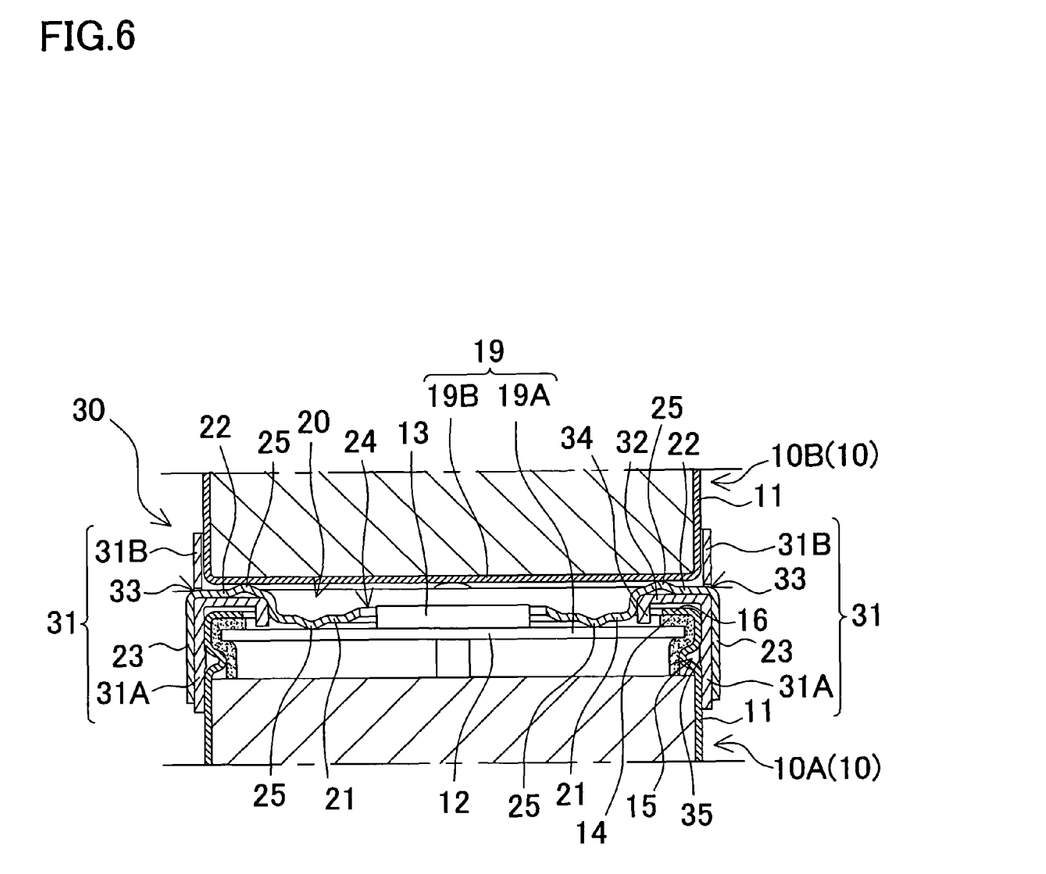
FIG. 6 is an enlarged cross-section view showing the battery connecting structure of the battery module shown in FIG. 5.
Figure 7:
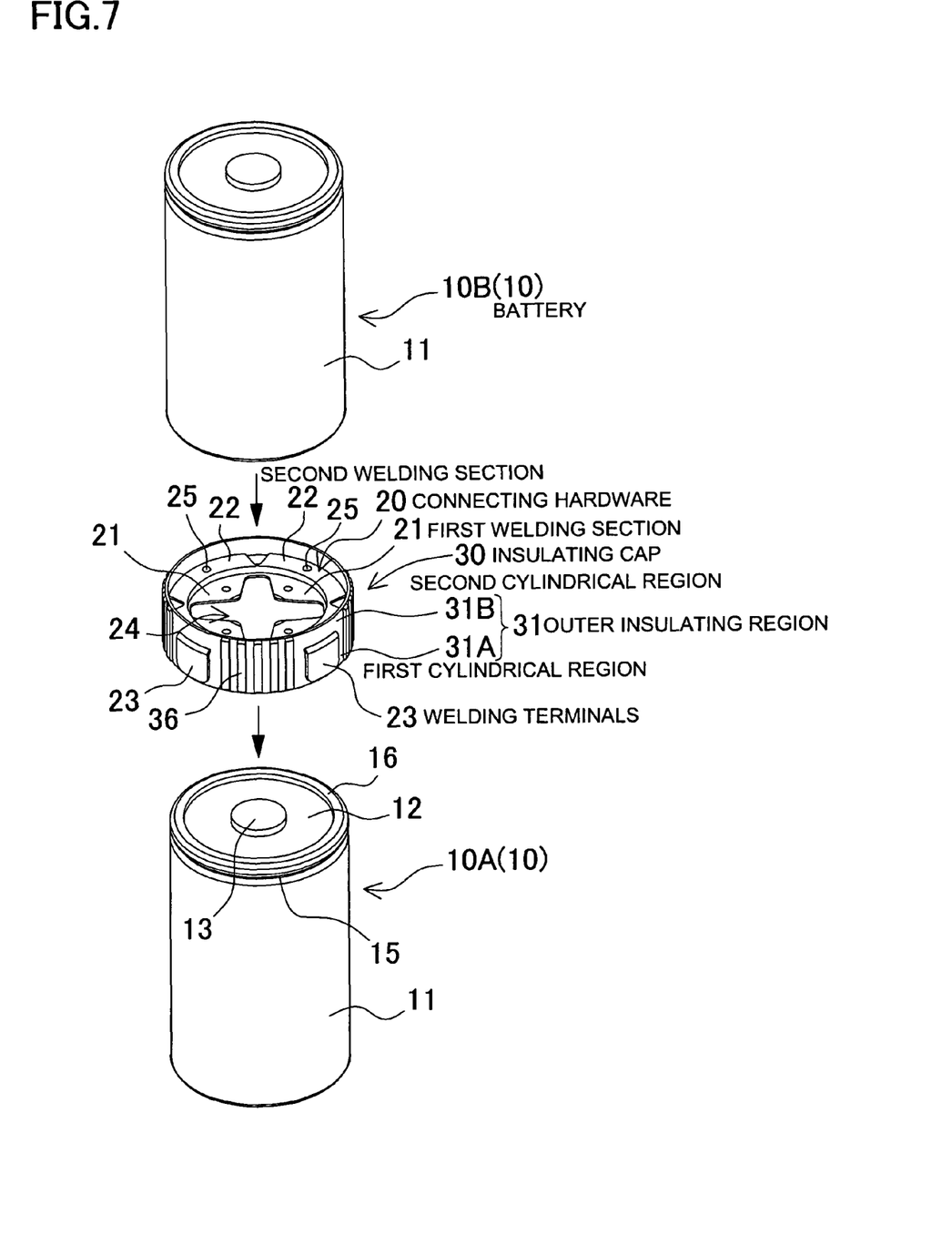
FIG. 7 is an exploded perspective view of the battery module shown in FIG. 5.

The battery module shown in FIGS. 5-7 has a plurality of rechargeable batteries 10 connected in series and joined in a straight-line configuration. A plurality of battery modules of this type are in turn connected in series and used primarily in electric vehicles such as the hybrid car. However, the battery module of the present invention can also be used in applications that require large output other than electric vehicles. The battery module has batteries 10, which are circular cylindrical batteries, connected in a straight-line configuration and in series. However, the battery module can also have rectangular batteries connected in a straight-line configuration and in series.

Any rechargeable battery, such as nickel hydride, lithium ion, or nickel cadmium can be used as a battery 10. However, the nickel hydride battery and lithium ion battery are well suited for use in an electric vehicle battery module. This is because they produce large output per unit of weight and volume, and have excellent high current characteristics.

A circular cylindrical battery has an open-ended external case 11 that is hermetically sealed by a sealing cap 12, which has a protruding electrode 13. The external case 11 and the sealing cap 12 are sheet metal. The external case 11 is made by press-forming sheet metal into the shape of a cylinder with a bottom. The sealing cap 12 is provided with a protruding electrode 13 at its center. Electrodes (not illustrated) are contained within the external case 11, which is filled with electrolyte solution. The open-end of the cylindrical external case 11 is crimped around the sealing cap 12 to hermetically seal it in place. The sealing cap 12 is held in a hermetically sealed fashion by the crimped region of the external case 11 via a gasket 14. The gasket 14 is an insulating rubber-like flexible material that insulates the sealing cap 12 from the external case 11 and hermetically seals the gap between the sealing cap 12 and the external case 11. To crimp and hold the sealing cap 12 in a battery of this configuration, a ring-shaped groove 15 is provided around the outside to hold the perimeter of the sealing cap 12. In addition, a crimping flange 16 is established around the outer edge of the sealing cap 12. In this battery 10, the sealing cap 12 is taken as the first electrode, and the external case 11 is taken as the second electrode. In a nickel hydride battery, the first electrode is the positive electrode, and the second electrode is the negative electrode. However, the battery can also have the first electrode as the negative electrode, and the second electrode as the positive electrode.

The battery module has a plurality of batteries 10 joined in a straight-line configuration and connected in series. Between the end-planes of the straight-line connected batteries 10 of the battery module, connecting hardware 20 is disposed to electrically connect the batteries 10, and insulating caps 30 are disposed to hold the connecting hardware 20 in position. In the battery module of FIGS. 5-7, the first end-plane electrode 19A, which is the sealing cap 12 of one battery 10, and the second end-plane electrode 19B, which is the bottom of the external case 11 of another battery 10 are connected via the connecting hardware 20. Since the sealing cap 12 and the external case 11 of a battery 10 are the positive and negative electrodes, a short circuit will result if the connecting hardware 20 connected to the sealing cap 12 touches the crimping flange 16, which is part of the external case 11. In the battery module shown in the cross-section view of FIG. 6, the connecting hardware 20 and the crimping flange 16 are insulated by the insulating cap 30.

The connecting hardware 20 is made by press-forming sheet metal. The connecting hardware 20 has metal plating layers established on both sides of a sheet-metal substrate, such as a steel sheet-metal substrate. The metal plating layers are a conductive plating layer with superior conducting properties and low electrical resistance, and a resistive plating layer laminated on the surface of the conductive plating suitable for welding. The conductive plating is copper, silver, or an alloy of those types of metals, and has lower electrical resistance than the sheet-metal substrate or the resistive plating. The resistive plating is nickel, chrome, or an alloy of those metals, and has higher electrical resistance than the conductive plating. This connecting hardware 20 is easily heated by the resistive plating, and is quickly welded to an end-plane electrode 19. In addition, the connecting hardware 20 has low electrical resistance by virtue of the conductive plating layer, and batteries 10 can be connected in series in with low resistance.

The connecting hardware 20 weld-connects opposing end-plane electrodes 19 of adjacent batteries and electrically connects those batteries 10 in series. The connecting hardware 20 is shown in FIGS. 6-10. This type of connecting hardware 20 is provided with a first welding section 21 that is welded to the first end-plane electrode 19A, which is the sealing cap 12 of one battery 10; a second welding section 22 outside the first welding section 21 that is welded to the second end-plane electrode 19B, which is the bottom surface of the external case 11 of another battery 10; and welding terminals 23 disposed at the outside perimeter of the batteries 10 outside the outer insulating region 31 of the insulating cap 30 and insulated by the outer insulating region 31. In the following, the battery 10 connected with the first welding section 21 of the connecting hardware 20 is referred to as the first battery 10A, and battery 10 connected with the second welding section 22 is referred to as the second battery 10B.

The connecting hardware 20 is sheet-metal press-formed in the shape of a ring with a hole that has the first welding section 21 established on the inside and the second welding section 22 established on the outside. The first welding section 21 and the second welding section 22 are welded to opposing end-plane electrodes 19 to connect adjacent batteries 10 in series. A center hole 24 is provided in the connecting hardware 20 of the figures, and the protruding electrode 13 is disposed there. However, the connecting hardware can also be shaped with a protruding region to align with the protruding electrode without having a center hole.

Figure 9:
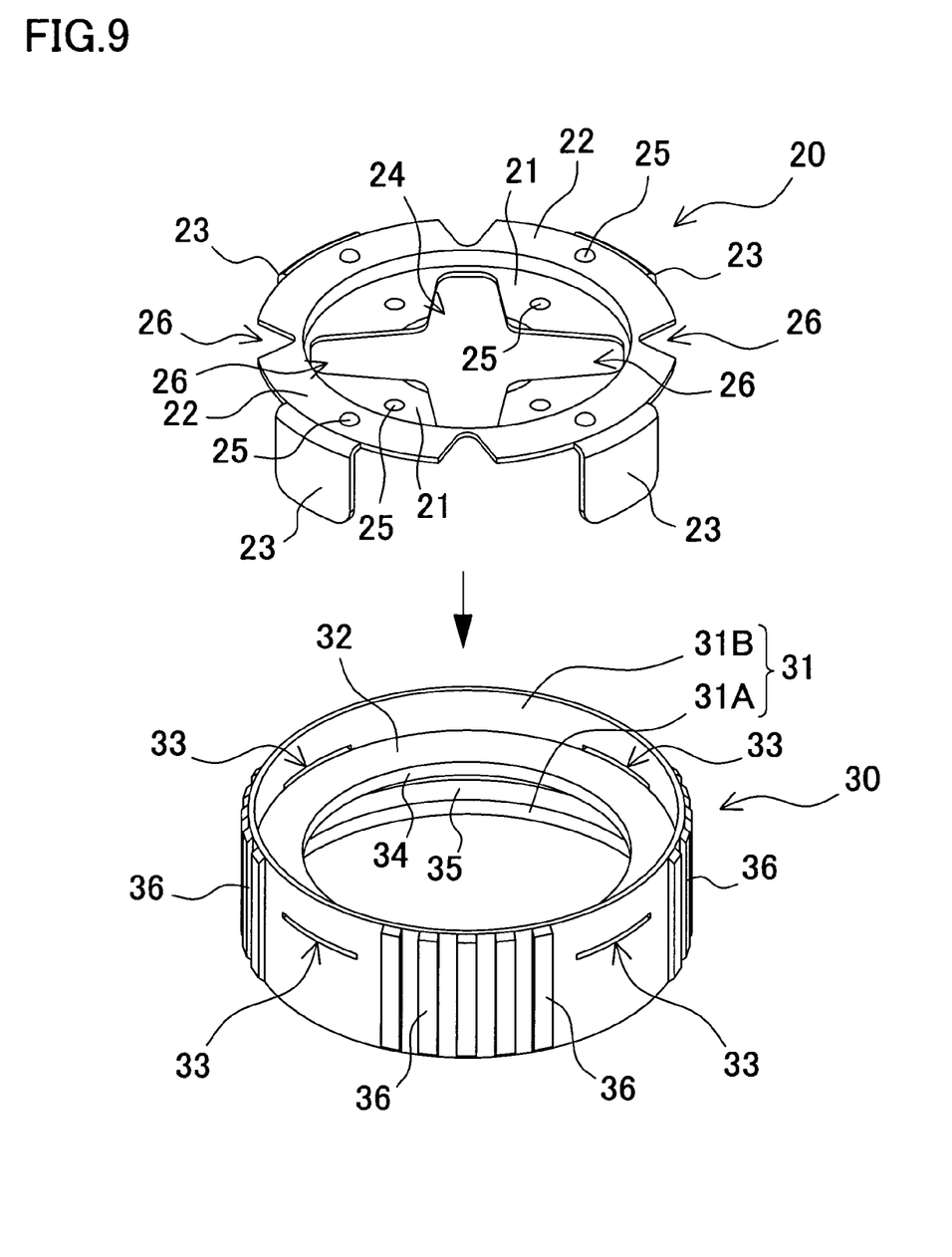
FIG. 9 is an exploded perspective view of the connecting hardware and insulating cap shown in FIG. 8.

The connecting hardware 20 shown in FIGS. 6 and 9 is sheet-metal press-formed in a shape that has a step between the first welding section 21 and the second welding section 22. The first welding section 21 is positioned in close proximity to the surface of the sealing cap 12 and is welded to that sealing cap 12. The second welding section 22 is insulated from the external case 11 of the first battery 10A by the insulating cap 30 and is positioned in close proximity to the bottom surface of the second battery 10B. The connecting hardware 20 is provided with a plurality of welding projections 25 for separately welding the first welding section 21 and the second welding section 22. Welding projections 25 on the first welding section 21 extend outward in the direction of the sealing cap 12 and are welded to the first end-plane electrode 19A, which is the sealing cap 12. Welding projections 25 on the second welding section 22 extend outward in the direction of the bottom surface of the external case 11 and are welded to the second end-plane electrode 19B, which is the bottom surface of the external case 11.

Figure 8:
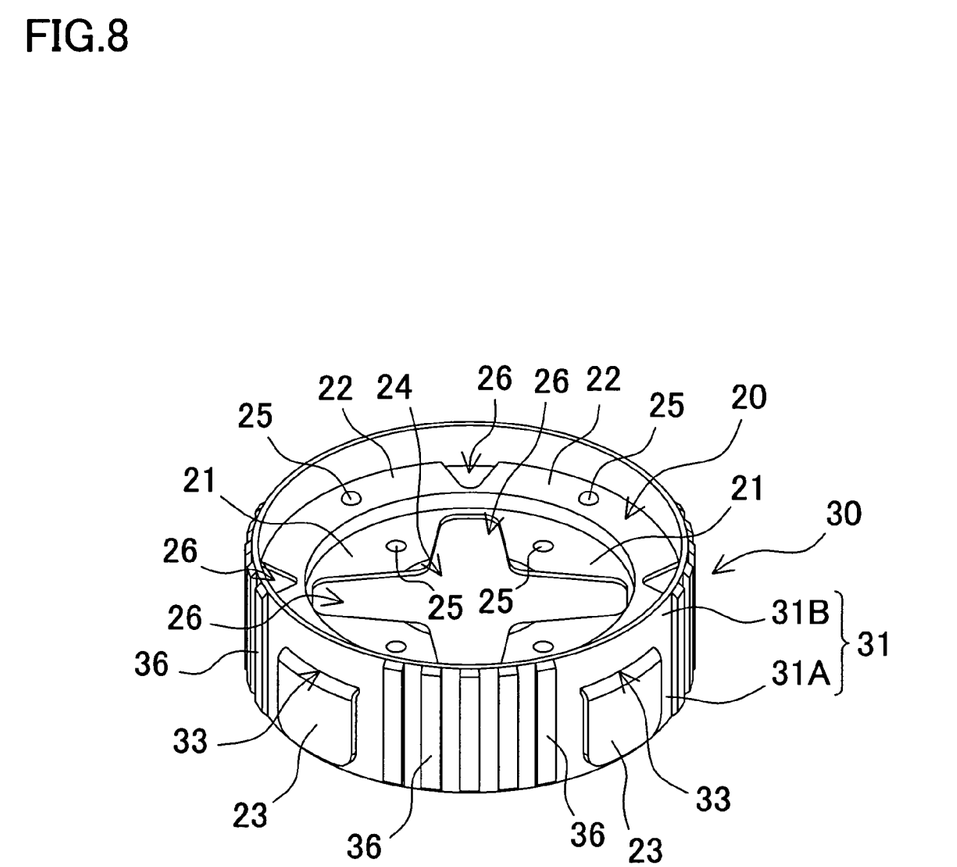
FIG. 8 is a perspective view of the connecting hardware and insulating cap.
Figure 10:
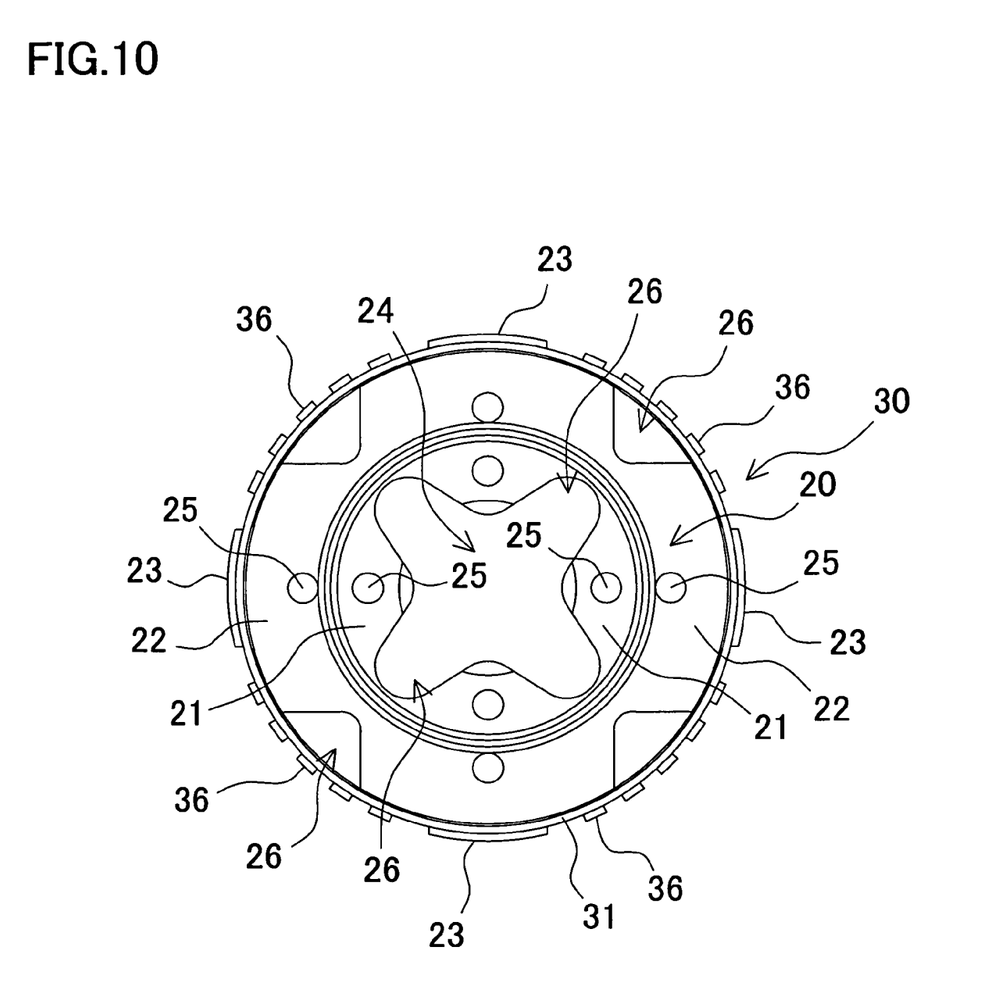
FIG. 10 is a plan view of the connecting hardware and insulating cap shown in FIG. 8.

The connecting hardware 20 shown in FIGS. 8-10 is provided with four welding projections 25 on both the first welding section 21 and the second welding section 22. The four welding projections 25 on the first welding section 21 and on the second welding section 22 lie on concentric circles. The welding projections 25 are equally spaced at 90° intervals around the first welding section 21 and the second welding section 22. Further, the welding projections 25 of the first welding section 21 and the second welding section 22 are disposed in proximity to each other.

In addition, cutout regions 26 are established between each pair of adjacent welding projections 25 on the first welding section 21 and the second welding section 22. The first welding section 21 cutout regions 26 extend from the center hole 24 of the first welding section 21 in a radial direction outward. The second welding section 22 cutout regions 26 extend from the outer perimeter towards the center of the connecting hardware 20. Cutout regions 26 are established at equally spaced at 90° intervals around the first welding section 21 and the second welding section 22.

The welding terminals 23 of the connecting hardware 20 shown in FIGS. 6 and 8 are disposed outside the outer insulating region 31 of the insulating cap 30 in which the first battery 10A is inserted. Welding terminals 23 are established so as to project from the outside of the second welding section 22 of the connecting hardware 20. As shown in the connecting hardware 20 of FIG. 9, the welding terminals 23 project out from outside the welding projections 25 established on the second welding section 22. The welding terminals 23 pass from inside to out through the outer insulating region 31 of the insulating cap 30 and are bent downward along the outside of the outer insulating region 31. These welding terminals 23 are disposed on the surface of the outer insulating region 31 in which the first battery 10A is inserted.

Figure 7A:
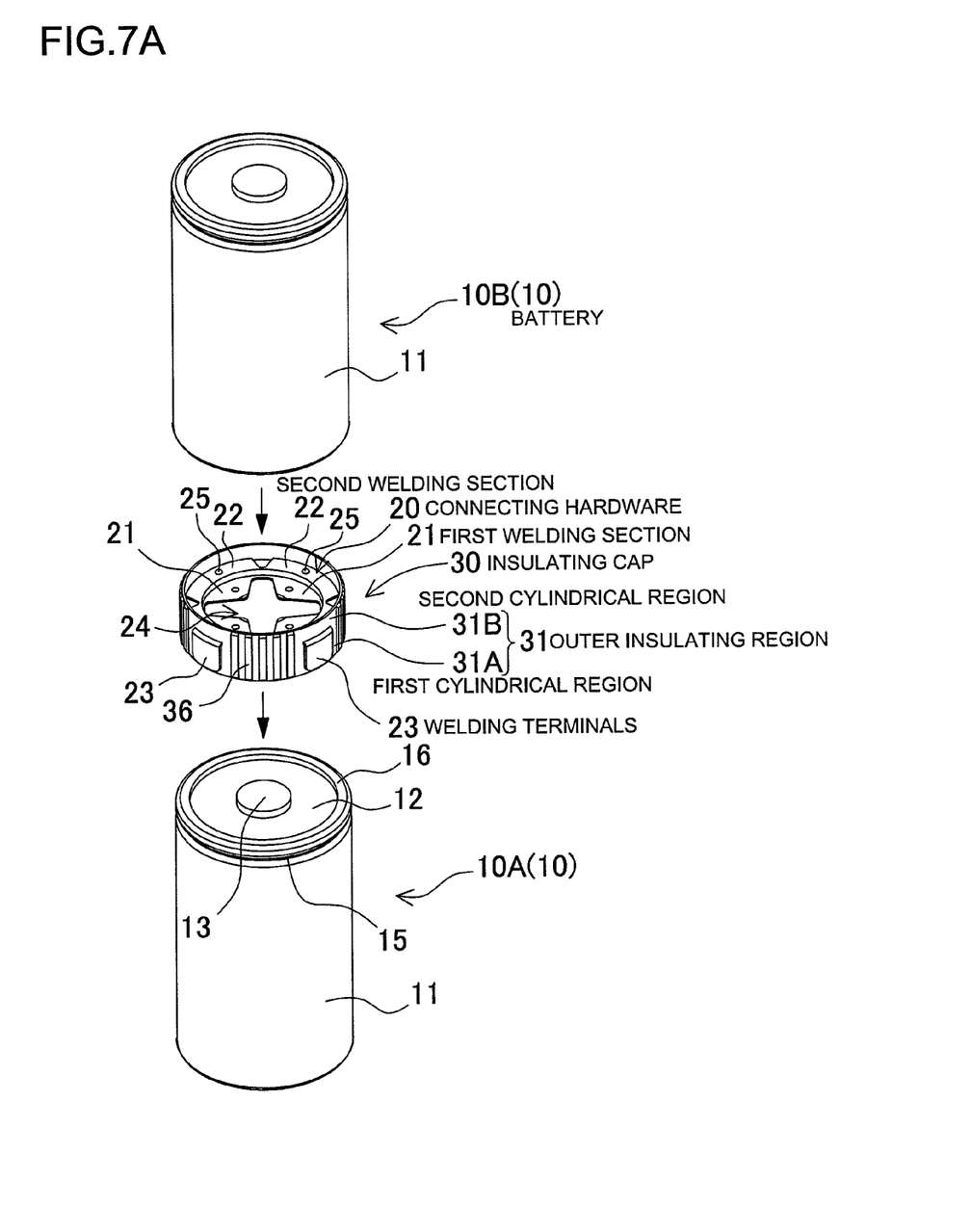
FIG. 7A is a modified exploded perspective view of the battery module.

The insulating cap 30 is formed entirely of insulating rubber-like flexible material. The insulating cap 30 has an outer insulating region 31 that covers the outer surfaces of series connected batteries 10. The outer insulating region 31 shown in FIGS. 6 and 9 has a cylindrical shape for insertion of end regions of battery 10. The cylindrical outer insulating region 31 is made up of a first cylindrical region 31A for insertion of the end region of the first battery 10A and a second cylindrical region 31B for insertion of the end region of the second battery 10B. The cylindrical region, which is the outer insulating region 31, has an inside shape equivalent to the outside shape of a battery 10 to allow insertion and connection of battery end regions in fixed positions. In an insulating cap 30 formed from elastically deformable rubber-like flexible material, the inside diameter of the cylindrical region of outer insulating region 31 can also be made smaller than the outside diameter of the battery 10, as shown in FIG. 7A. With the battery end regions inserted in the cylindrical region, the cylindrical region is in a stretched state. In an insulating cap 30 configured with a cylindrical outer insulating region 31, which has a first cylindrical region 31A and a second cylindrical region 31B, the end regions of batteries 10 to be connected together can be inserted and joined in fixed positions.

Figure 11:
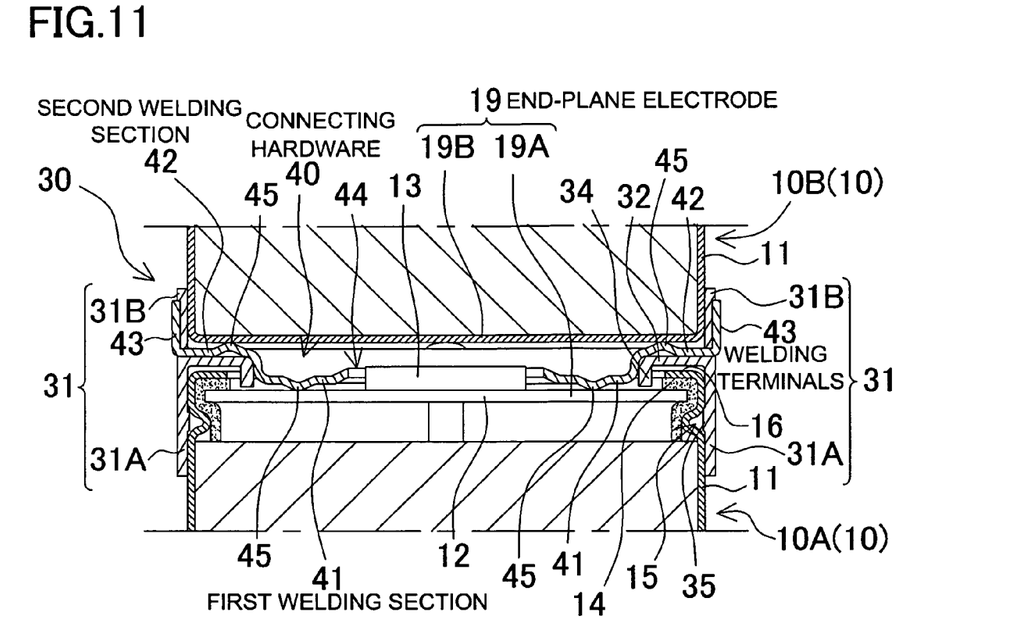
FIG. 11 is an enlarged cross-section view showing the connecting hardware for another embodiment of the present invention.

The connecting hardware 20 of FIGS. 6-9 has welding terminals 23 disposed outside the first cylindrical region 31A. The insulating cap 30 is provided with openings 33 in the cylindrical region, which is the outer insulating region 31, for insertion of the welding terminals 23. As shown in the cross-section view of FIG. 11, the connecting hardware 40 can also have welding terminals 43 established outside the second cylindrical region 31B in which the second battery 10B is inserted. In FIG. 11, 41 is the first welding section, 42 is the second welding section, 44 is the center hole, and 45 are welding projections.

In the insulating cap 30 of FIGS. 8-10, the outside diameter of the connecting hardware 20 is equivalent to the inside diameter of the cylindrical region of the outer insulating region 31. This connecting hardware 20 can be inserted in the cylindrical region of the insulating cap 30 and held in a fixed position in the insulating cap 30. Further, the insulating cap 30 is provided with openings 33 to insert welding terminals 23. Since the welding terminals 23 can be inserted through the openings 33, the connecting hardware 20 can be held in a fixed position in the insulating cap 30 via the welding terminals 23. Consequently, the insulating cap 30 and the separately fabricated connecting hardware 20 can be joined in fixed relative positions by passing the welding terminals 23 through the openings 33. The connecting hardware 20 and insulating cap 30 connected as a single unit are disposed between batteries 10 to connect them in series and in a straight-line configuration. As shown in FIG. 11, during formation of the insulating cap 30, the connecting hardware 40 can also be insert molded in a fixed position in the insulating cap 30 giving the combined unit a single-piece structure.

The insulating cap 30 of FIG. 6 is provided with an annular stopper 35 that projects from the inside surface of the first cylindrical region 31A. The annular stopper 35 mates with the ring-shaped groove 15 established around the perimeter of the first battery 10A. The first battery 10A is inserted into the first cylindrical region 31A of this insulating cap 30 and the annular stopper 35 fits into the ring-shaped groove 15 for connection that does not slide apart easily.

The insulating cap 30 of FIG. 8 is provided with an insulating ring 32 projecting from its inside surface to prevent the external case 11 of the first battery 10A from shorting with the external case 11 of the second battery 10B. The insulating ring 32 is positioned at the surface of the crimping flange 16 of the first battery 10A and insulates the surface of that crimping flange 16. The second welding section 22 of the connecting hardware 20 is disposed on the upper surface of the insulating ring 32 and is insulated from the crimping flange 16 of the first battery 10A. In addition, a ring projection 34 formed as a single-piece at the inside edge of the insulating ring 32 is provided to cover the inside surface of the crimping flange 16. The ring projection 34 is shaped to fit inside the crimping flange 16. The ring projection 34 of this insulating cap 30 mates with the inside of the crimping flange 16 to hold the insulating cap 30 in a fixed position at the end of the first battery 10A.

Finally, the insulating cap 30 is provided with a plurality of vertical ribs 36 extending in the direction of the axis of the battery module on the surface of the outer insulating region 31. These vertical ribs 36 project outward from the surface of the outer insulating region 31 and are established in a single-piece structure with the outer insulating region 31 extending from its bottom edge to its top edge. In the insulating cap 30, a plurality of vertical ribs 36 are established at equal intervals positioned between welding terminals 23 disposed on the outer insulating region 31. In this way, an insulating cap 30 provided with a plurality of vertical ribs 36 extending in the axial direction on the surface of the outer insulating region 31 can reinforce from the outside the first cylindrical region 31A and the second cylindrical region 31B that hold battery end regions, and can retain its prescribed shape. Consequently, it has the characteristic that the operation of inserting battery end regions into the first cylindrical region 31A and the second cylindrical region 31B can be performed easily.

The battery module described above has adjacent batteries 10 connected in series by the following steps.

(1) With the connecting hardware 20 and insulating cap 30 configured as a single piece, the unit is set on the first battery upper end region, namely on the sealing cap 12. Here, the end region of the first end-plane electrode 19A of the first battery 10A is inserted in the first cylindrical region 31A of the insulating cap 30.

(2) A pair of welding electrodes 50 is pressed onto the first welding section 21 and welding current is passed through the welding electrodes to weld the first welding section 21 to the sealing cap 12.

(3) The bottom end region of the second battery 10B is inserted in the second cylindrical region 31B of the insulating cap 30, and the second end-plane electrode 19B, which is the bottom surface of the external case 11 of the second battery 10B, is put in contact with the second welding section 22.

Figure 12:
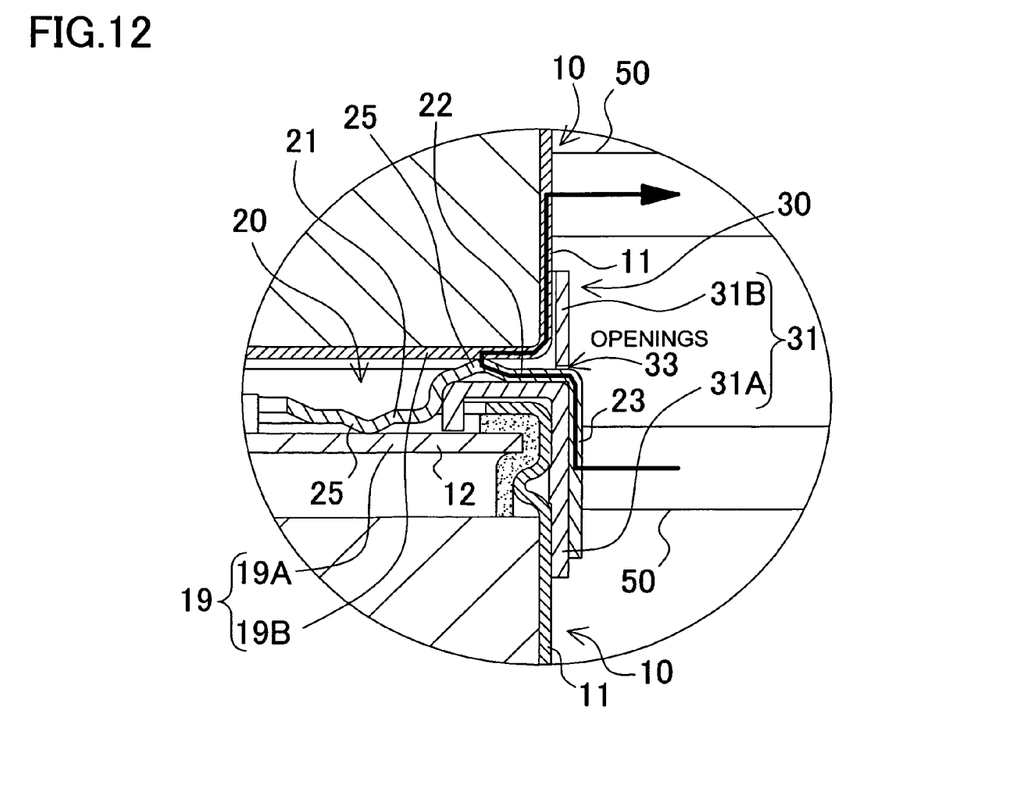
FIG. 12 is an enlarged cross-section view showing the second welding section of the connecting hardware being welded to the bottom surface of an external case.

(4) As shown in the enlarged cross-section view of FIG. 12, a pair of welding electrodes is pressed onto the outer surface of the bottom end of the external case 11 of the second battery 10B and onto the welding terminal 23 of the connecting hardware 20. Welding current is passed through the welding electrodes to weld the second welding section 22 to the second end-plane electrode 19B, which is the bottom surface of the external case 11 of the second battery 10B. Here, welding current flows by the route shown by the arrow in FIG. 12, and damage to the second battery 10B is prevented.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2007-171065 filed in Japan on Jun. 28, 2007, the content of which is incorporated herein by reference.

What is claimed is:

1. A battery module comprising:
   a plurality of batteries joined in a straight-line configuration, each of the batteries having a circular cylindrical shape defining a cylindrical outer side surface and end-planes at opposite ends thereof, the opposite end planes being formed as electrodes having different polarity, respectively;
   wherein the plurality of batteries includes at least a first battery and a second battery connected in series by a connecting part and an insulating cap for insulating the first and second batteries,
   wherein the insulating cap has an outer insulating region that covers portions of the outer side surfaces of the first and second batteries, and
   the connecting part comprises:
   a first welding section welded to the end-plane electrode of the first battery;

a second welding section welded to the end-plane electrode of the second battery that opposes the end-plane of the first battery; and at least one welding terminal disposed on the outer insulating region of the insulating cap, wherein the outer insulating region of the insulating cap is positioned between the welding terminal of the connecting part and the outer side surface of one of the first and second batteries so that the welding terminal is insulated by the outer insulating region of the insulating cap from the outer side surface of the one of the first and second batteries.

2. The battery module as claimed in claim 1, wherein:

each of the first and second batteries comprises an external case having an open end and a sealing cap for hermetically sealing the open end of the external case;

the sealing cap has a protruding electrode; and the open-end of the external case is crimped around the sealing cap so that the external case is hermetically sealed in place, and thereby a crimping flange is established around the perimeter of the sealing cap.

3. The battery module as claimed in claim 2, wherein:

the connecting part is sheet-metal formed in a shape that has a step between the first welding section and the second welding section;

the first welding section is positioned in close proximity to the surface of the sealing cap of the first battery and is welded to the sealing cap of the first battery; and the second welding section is insulated from the external case of the first battery by the insulating cap and is positioned in close proximity to a bottom surface of the second battery.

4. The battery module as claimed in claim 1, wherein the connecting part comprises a plurality of welding projections at the first welding section and at the second welding section, and the connecting part defines first cutout regions between adjacent welding projections of the plurality of welding projections of the first welding section and second cutout regions between adjacent welding projections of the plurality of welding projections of the second welding section.

5. The battery module as claimed in claim 1, wherein the outer insulating region of the insulating cap has a cylindrical shape to permit insertion of battery end regions.

6. The battery module as claimed in claim 1, wherein the outer insulating region of the insulating cap has a first cylindrical region where an end region of the first battery is positioned and a second cylindrical region where an end region of the second battery is positioned.

7. The battery module as claimed in claim 6, wherein the welding terminal of the connecting part is disposed outside the first cylindrical region of the insulating cap.

8. The battery module as claimed in claim 1, wherein the outer insulating region of the insulating cap has a first cylindrical region for insertion of a battery end region of the first battery, and the welding terminal of the connecting part is disposed outside the first cylindrical region.

9. The battery module as claimed in claim 1, wherein the connecting part is insert-molded in the insulating cap.

10. The battery module as claimed in claim 1, wherein an inside diameter of the cylindrical outer insulating region of the insulating cap is equal to an outside diameter of the second welding section of the connecting part, and the second welding section is inserted in the insulating cap and retained in a fixed position in the insulating cap.

11. The battery module as claimed in claim 1, wherein:

the insulating cap and the connecting part are separate parts;

the connecting part comprises a plurality of welding terminals;

the insulating cap is provided with a plurality of openings through which the welding terminals of the connecting part pass, respectively; and the connecting part welding terminals are inserted through the openings to join the connecting part with the insulating cap.

12. The battery module as claimed in claim 1, wherein the insulating cap is provided with an annular stopper that projects from an inside surface of the first cylindrical region, and the annular stopper mates with a ring-shaped groove formed in the outer side surface of the first battery.

13. The battery module as claimed in claim 2, wherein:

each of the first and second batteries has an external case;

the insulating cap is provided with an insulating ring projecting from an inside surface of the insulating cap to prevent the external case of the first battery from shorting with the external case of the second battery; and the insulating ring is provided with a ring projection, formed as a single-piece at an inside edge of the insulating ring, to cover an inside surface of the crimping flange.

14. The battery module as claimed in claim 1, wherein the insulating cap is formed of a flexible material.

15. The battery module as claimed in claim 14, wherein an inside diameter of the cylindrical outer insulating region of the insulating cap is smaller than an outside diameter of the first battery.

16. The battery module as claimed in claim 1, wherein the insulating cap is provided with a plurality of vertical ribs on the outer insulating region, and the ribs extend in an axial direction of the battery module.

17. The battery module as claimed in claim 16, wherein the vertical ribs project outward from the outer insulating region and are disposed at positions between welding terminals disposed on the outer insulating region.

18. The battery module as claimed in claim 1, wherein the outer insulating region of the insulating cap is elongated so as to be longer than the welding terminal of the connecting part in the longitudinal direction of the first battery.

19. The battery module as claimed in claim 1, wherein the first welding section is disposed radially inwardly of the second welding section which is radially inward of the perimeter of the opposing end planes of the first and second batteries.

* * * * *